(12) United States Patent
Blum

(10) Patent No.: US 8,308,208 B1
(45) Date of Patent: Nov. 13, 2012

(54) MAGNETIC LOCKING TONGS

(76) Inventor: Alvin Blum, Fort Lauderdale, FL (US)

( * ) Notice: Subject to any disclaimer, the term of this patent is extended or adjusted under 35 U.S.C. 154(b) by 0 days.

(21) Appl. No.: 13/374,163

(22) Filed: Dec. 15, 2011

Related U.S. Application Data

(63) Continuation-in-part of application No. 12/459,807, filed on Jul. 8, 2009.

(51) Int. Cl.
A47G 21/10 (2006.01)
A47J 43/28 (2006.01)

(52) U.S. Cl. .................. 294/16; 294/99.2; 294/106

(58) Field of Classification Search ............. 294/3, 8.5, 294/11, 16, 33, 99.2, 65.5, 106; 269/8; 335/296
See application file for complete search history.

(56) References Cited

U.S. PATENT DOCUMENTS

| | | | |
|---|---|---|---|
| 254,631 A | 3/1882 | Fisher | |
| 993,720 A | 5/1911 | Schneider | |
| 3,425,468 A * | 2/1969 | Soucy | 81/489 |
| 4,105,239 A * | 8/1978 | Akczinski, Sr. | 294/65.5 |
| D350,050 S | 8/1994 | Klunder | |
| 5,653,488 A | 8/1997 | Ordonez | |
| 6,056,338 A | 5/2000 | Kerr | |
| 6,131,977 A | 10/2000 | Sacks | |
| 6,386,609 B1 * | 5/2002 | Govzman | 294/207 |
| 6,435,358 B1 | 8/2002 | Decal | |
| 6,726,263 B2 | 4/2004 | Wang | |
| 6,854,776 B2 | 2/2005 | Downing | |
| 6,869,117 B1 | 3/2005 | Blum | |
| D528,353 S | 9/2006 | Brady | |
| D545,138 S | 6/2007 | Dockendorf | |
| 2005/0028386 A1 * | 2/2005 | Hughes | 30/298.4 |
| 2006/0000788 A1 * | 1/2006 | Sholem | 211/70.6 |
| 2007/0084063 A1 * | 4/2007 | Hughes | 30/298.4 |
| 2007/0284795 A1 * | 12/2007 | Lancaster-Larocque | 269/8 |

* cited by examiner

Primary Examiner — Paul T Chin
(74) Attorney, Agent, or Firm — Alvin S. Blum

(57) ABSTRACT

Kitchen tongs have two arms, each having a hinge end with a handle portion and a grasping end. A spring at pivotally joined hinge ends biases the grasping ends away from each other in open position. A support member on each arm intermediate the handle portion and the grasping end is located such that the weight between the hinge end and the support member is greater than the weight between the grasping end and the support member. The support members extend from the arms sufficiently to cause the grasping ends to be elevated above a horizontal planar support surface when the hinge ends and the support members are resting on the support surface so that the tongs may rest upon a planar support surface without contaminating the support surface or the grasping ends. A sliding element moves between two magnets for locking and unlocking tongs with one hand.

2 Claims, 3 Drawing Sheets

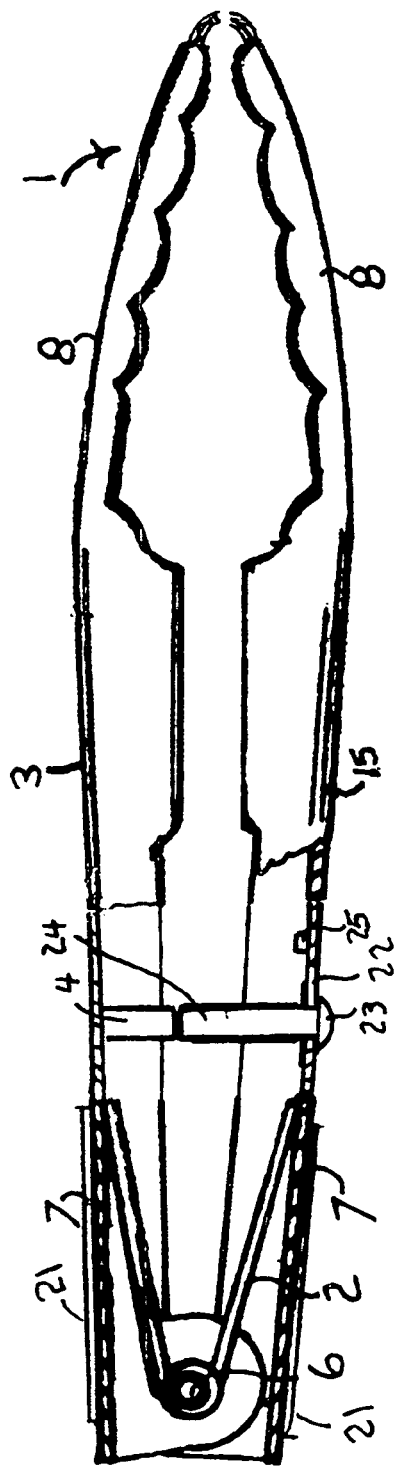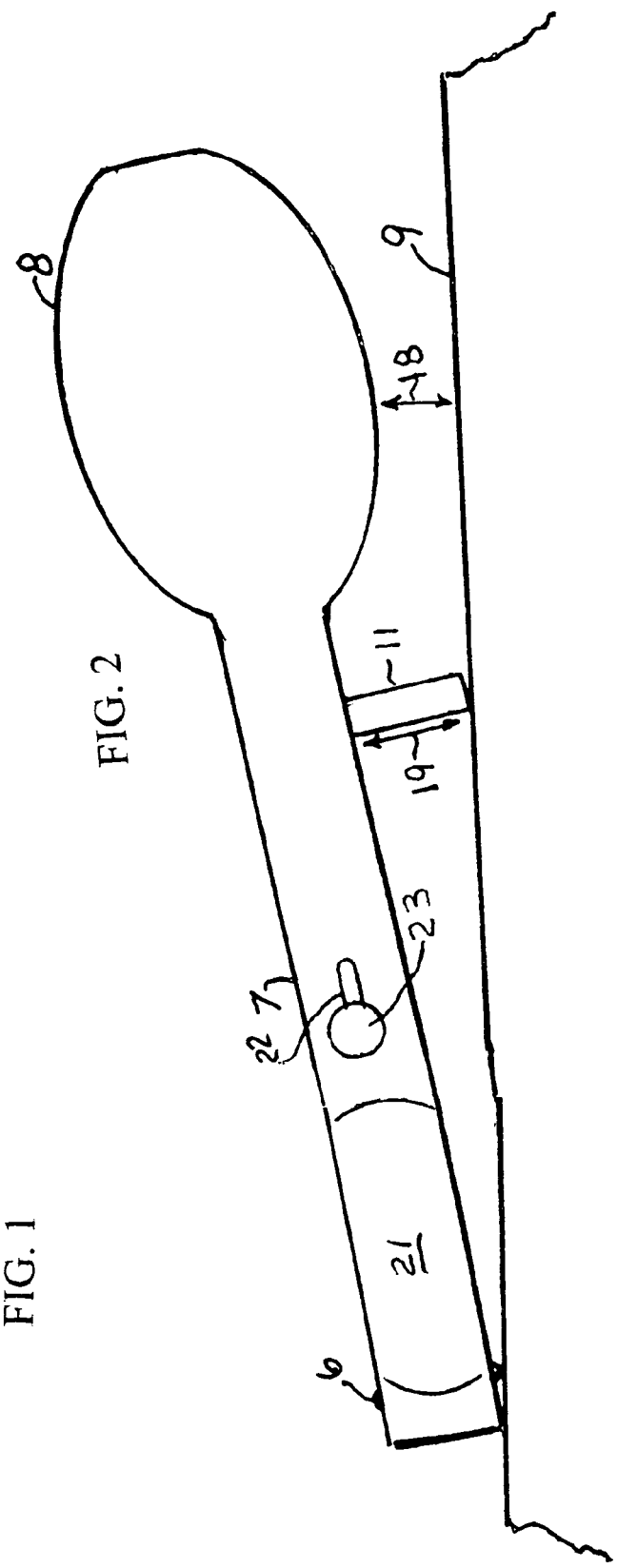
FIG. 1
FIG. 2

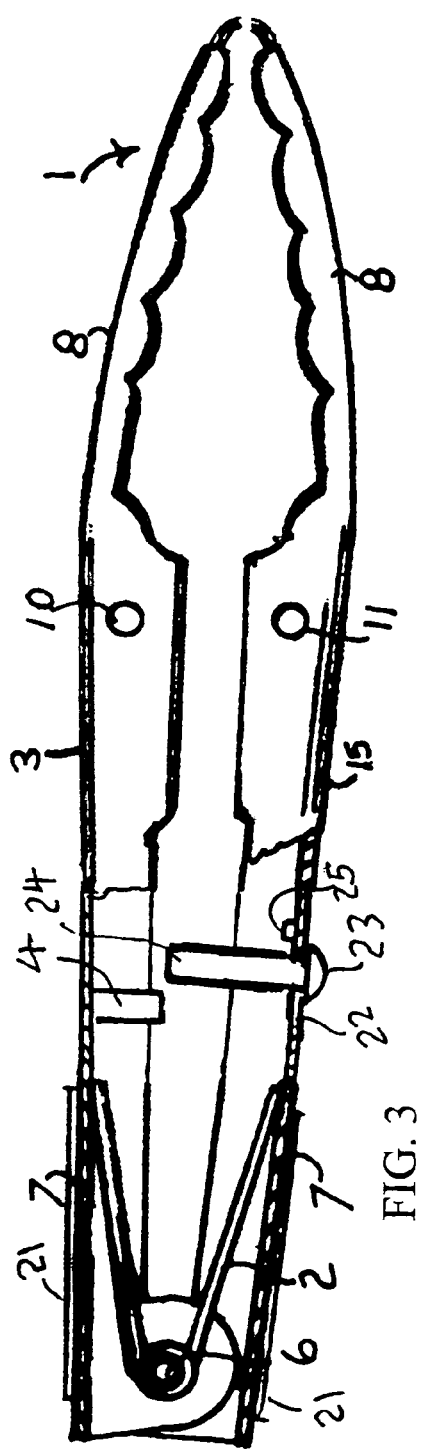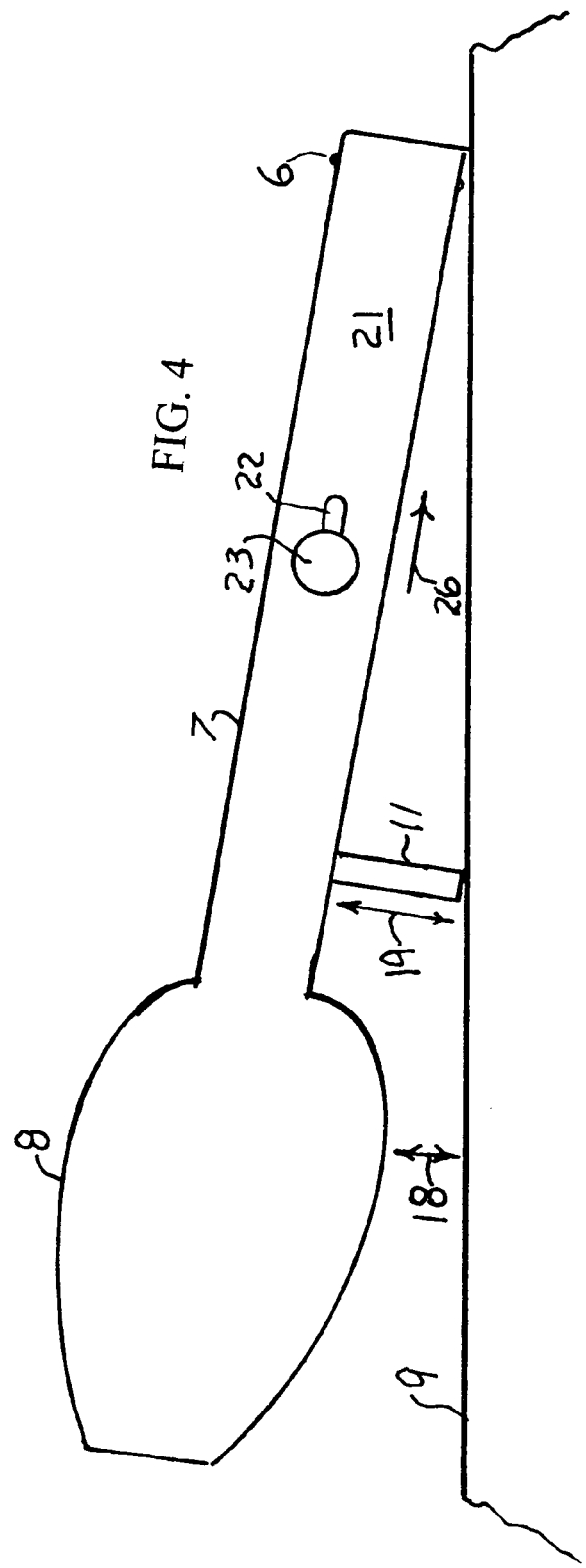

MAGNETIC LOCKING TONGS

This application is a continuation in part of patent application Ser. No. 12/459,807 filed Jul. 8, 2009.

FIELD OF THE INVENTION

This invention relates generally to kitchen tongs operable with one hand for grasping items, and more particularly to such tongs having magnetic locking and attached support structure that keeps the grasping end above a planar support surface when resting on that support surface.

BACKGROUND OF THE INVENTION

U.S. Pat. No. 6,056,338 issued May 2, 2000 reviews the prior art on kitchen tongs with spring mechanisms to keep the two grasping ends apart with various means for locking the grasping ends together when not in use. Applicant disclosed in U.S. Pat. No. 6,869,117 issued Mar. 22, 2005 a magnetic means for locking the ends together when not in use. This has a free sliding lock that can unintentionally lock closed when the slide moves under gravity to the locked position. When between uses, the tongs may be laid down on a resting surface to free hands for other tasks. Resting on a surface, the grasping end may soil the resting surface, and be itself contaminated. U.S. Pat. No. 6,435,358 issued Aug. 20, 2002 to Decal teaches a separate holder for resting the tongs that will keep the grasping ends off the counter surface. U.S. Pat. No. 5,678,790 issued Oct. 21, 1997 discloses a spoon rest that fits on the handle of a pot. U.S. Pat. No. 4,515,332 issued May 7, 1985 discloses a utensil support that holds a utensil over a sink. Although separate rests or holders for tongs have been taught, it would be useful to have a means of supporting the grasping end of the tongs above a resting support surface that would be integral with the tongs.

SUMMARY OF THE INVENTION

It is accordingly an object of the invention to provide a tongs structure that enables the tongs to be rested on a horizontal planar support surface, such as those commonly found at food preparation locations, with the grasping ends of the tongs held above the support surface so that the grasping ends will not touch the support surface. This will prevent the contamination of the grasping ends. This is most important when the tongs are used in food processing. It will also reduce contamination of the support surface.

The kitchen tongs of the invention have two arms, each having a hinge end with a handle portion and a grasping end. A spring connecting both hinge ends cooperates to bias the grasping ends away from each other in an open position. A magnetic locking mechanism may lock the arms with the grasping ends together in the closed position. A secondary magnet may prevent the sliding lock member from inadvertently sliding to the locked position. A support member affixed to each of the arms at a location intermediate the handle portion and the grasping end is located such that the weight between the hinge end and the support member is greater than the weight between the grasping end and the support member. The support members extend from the arms sufficiently to cause the grasping ends to be elevated above a horizontal planar support surface when the hinge ends and the support members are resting on the support surface so that the tongs may rest upon a horizontal support surface without contaminating the support surface or the grasping ends.

These and other objects, features, and advantages of the invention will become more apparent from the detailed description of an exemplary embodiment thereof as illustrated in the accompanying drawings, in which like elements are designated by like reference characters in the various drawing figures.

BRIEF DESCRIPTION OF THE DRAWINGS

FIG. 1 is a top view of a tongs of the invention locked closed and partially in section.

FIG. 2 is a side elevation view of the tongs of FIG. 1 resting on a planar support surface.

FIG. 3 is a bottom view of the tongs held open and partially in section.

FIG. 4 is a side elevation view of the tongs of FIG. 3 resting on a planar support surface.

DETAILED DESCRIPTION OF PREFERRED EMBODIMENTS

Figure 5:
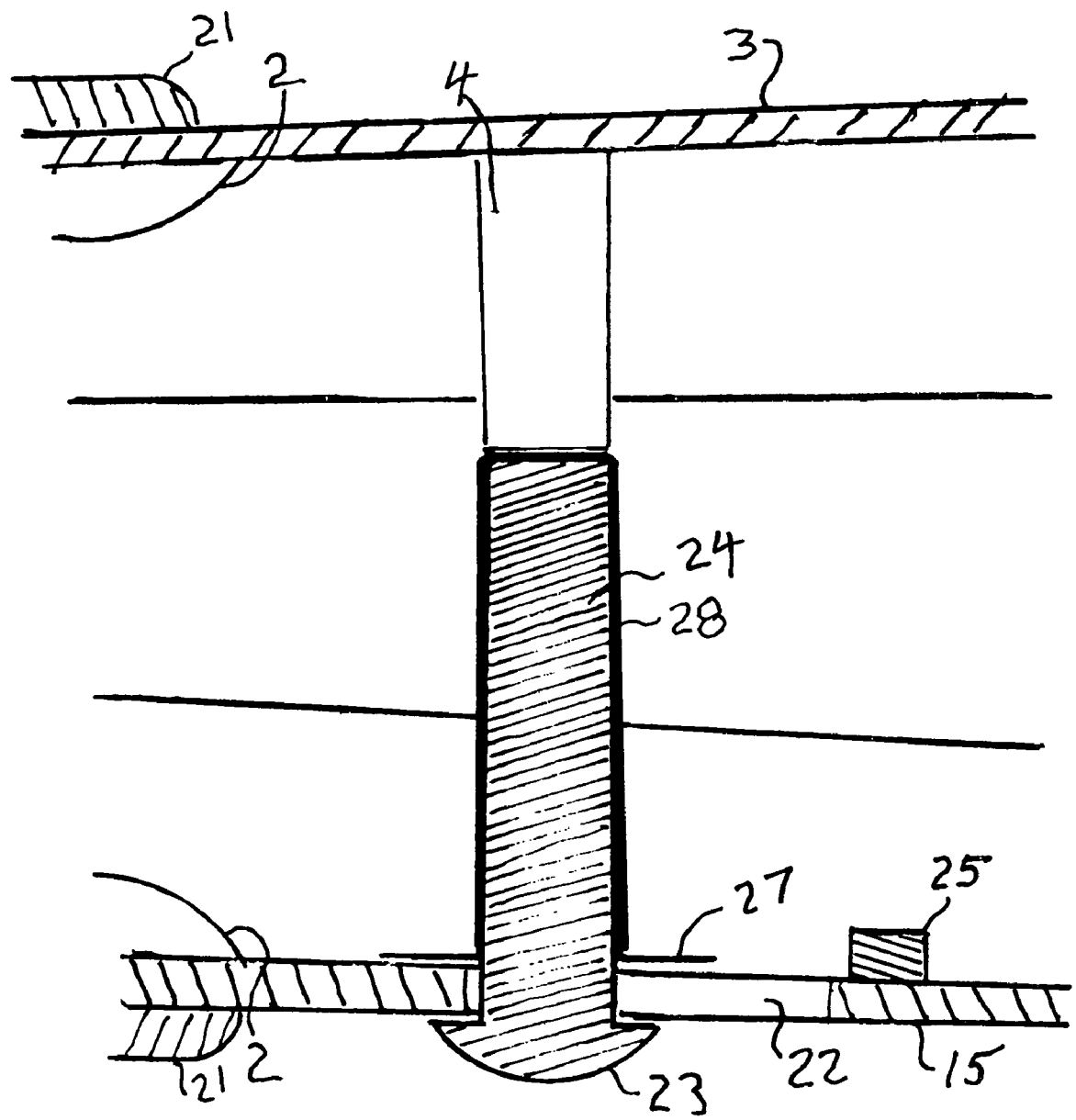
FIG. 5 is a sectional detail of the locking mechanism shown in FIG. 1.

Referring now the drawing Figures, a tongs 1 has two arms 3 and 15. Each arm has a grasping end 8, a hinge end 7, and a handle portion 21 adjacent the hinge end. A spring 2 biases the two arms 3, 15 to the open position, and a magnetic locking mechanism 4, 24 holds the two arms close together against the spring bias when not in use for easier storage. A pivot 6 pivotally joins the arms 3, 15 together at the hinge ends 7. The grasping ends 8 will be in contact with food during use. Support members 10, 11 are affixed to the arms 3, at a location intermediate the handle portion 21 on hinge ends 7 and the grasping ends 8, such that the weight is greater at the hinge end. The support members 10 and 11 extend away from the arms a distance 19 such that when the tongs lies on a horizontal planar support surface 9 between uses, the hinge end 7, being heavier, will fall down to the horizontal support surface 9 and the grasping ends 8 will be suspended above the support surface by a space 18. This mechanism ensures that the grasping ends 8 will not contaminate the support surface 9, and also will ensure that the food will not be contaminated by the grasping ends touching the support surface. By having the support members extend from the sides of the arms, as shown, the tongs are in position to be gripped by one hand in operating position when resting on a support surface. This further enhances the ease of use of the invention, since all operations can be performed with one hand. The magnetic locking mechanism comprises a first permanent magnet 4 affixed to an inner aspect of the first arm and a ferromagnetic rod member 24 slideably mounted on an inner aspect of the second arm. The member 24 is adapted to slide in slot 22 from a locking position engaging the permanent magnet when the arms are in closed position, as shown in FIGS. 1, 2 and 5, to an unlocked position away from the permanent magnet under the action of a captive slide button element 23 on an outer aspect of the second arm, as shown in FIGS. 3 and 4. The captive element 23 is affixed to the ferromagnetic member 24 and accessible to a digit of a hand grasping the handle portion 21. A second permanent magnet 25 is affixed to the second arm adapted to hold the ferromagnetic member 24 in the unlocked position. As best seen in the enlarged detail of FIG. 5, the ferromagnetic member 24 may include a sleeve 24 over the headed solid rod 23 that traps a washer 27 between the sleeve 28 and the arm 15. The washer is large enough to prevent the member 24 from passing through slot 22 in arm 15. Alternatively, the washer 27 may be in the form of a flange on the sleeve (not shown). The sleeve 28, washer 27 and rod 23 are preferably made of a ferromagnetic stainless steel. When the member 23 is in the unlocked position of FIGS. 3 and 4, the secondary small magnet 25 holds the washer 27 to prevent the tongs from inadvertently locking when closed. Movement of member 23 in the direction of arrow 26 moves the mechanism to the locked position when the tongs are closed. This maneuver may be performed with a digit while the operator is grasping handle 21 with the same hand for one-handed operation.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

The invention claimed is:

1. Lockable kitchen tongs comprising:
   a first arm having a hinge end with a handle portion and a grasping end;
   a second arm having a hinge end with a handle portion and a grasping end;
   the first and second arms pivotally connected at the hinge ends; biasing the grasping ends away from each other in an open position;
   a magnetic locking mechanism adapted to hold the grasping ends together in a closed position, while overcoming the spring means;
   a support member affixed to each of the arms at a location intermediate the handle portion and the grasping end such that the weight between the hinge end and the support member is greater than the weight between the grasping end and the support member;
   the support members extending from the arms sufficiently to cause the grasping ends to be elevated above a horizontal planar support surface when the hinge ends and the support members are resting on the surface in the locked position; and
   in which the magnetic locking mechanism comprises:
   a first permanent magnet affixed to an inner aspect of the first arm and a ferromagnetic member slideably mounted on an inner aspect of the second arm, the member adapted to slide from a locking position engaging the permanent magnet when the arms are in closed position to an unlocked position away from the permanent magnet under the action of a captive element on an outer aspect of the second arm, the captive element affixed to the ferromagnetic member and accessible to a hand grasping the handle portion; and
   a second permanent magnet affixed to the second arm adapted to hold the ferromagnetic member in the unlocked position.

2. Kitchen tongs operable with one hand between locked open and locked closed conditions, the tongs comprising:
   a first arm having a hinge end with a handle portion and a grasping end;
   a second arm having a hinge end with a handle portion and a grasping end;
   the first and second arms pivotally connected at the hinge ends;
   spring means at both hinge ends cooperating with the first arm and the second arm for biasing the grasping ends away from each other in an open position;
   a magnetic locking mechanism adapted to hold the grasping ends together in a closed position, while overcoming the spring means, the locking mechanism including a first permanent magnet affixed to an inner aspect of the first arm and a ferromagnetic member slideably mounted on an inner aspect of the second arm, the ferromagnetic member adapted to slide from a locking position engaging the first permanent magnet when the arms are in closed position to an unlocked position away from the first permanent magnet under the action of a captive element on an outer aspect of the second arm, the captive element affixed to the ferromagnetic member and accessible to a digit of a hand grasping the handle portion; and a second permanent magnet affixed to the second arm adapted to hold the ferromagnetic member in the unlocked position.

\* \* \* \* \*